US012621144B2

(12) United States Patent
Mamadapur et al.

(10) Patent No.: US 12,621,144 B2
(45) Date of Patent: May 5, 2026

(54) SYSTEM FOR MONITORING ACCESS TO A VIRTUAL ENVIRONMENT USING DEVICE TAGGING

(71) Applicant: BANK OF AMERICA CORPORATION, Charlotte, NC (US)

(72) Inventors: Krishna Rangarao Mamadapur, Maharashtra (IN); Jigesh Rajendra Safary, Mumbai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 301 days.

(21) Appl. No.: 18/113,211

(22) Filed: Feb. 23, 2023

(65) Prior Publication Data

US 2024/0291652 A1 Aug. 29, 2024

(51) Int. Cl.
*H04L 9/08* (2006.01)
*G06N 3/04* (2023.01)

(52) U.S. Cl.
CPC ............. *H04L 9/0894* (2013.01); *G06N 3/04* (2013.01); *H04L 9/0866* (2013.01)

(58) Field of Classification Search
CPC ........ H04L 9/0894; H04L 9/0866; G06N 3/04
USPC ....................................... 713/171
See application file for complete search history.

(56) References Cited

U.S. PATENT DOCUMENTS

| | | | |
|---|---|---|---|
| 8,219,616 B2 | 7/2012 | Dawson | |
| 8,504,615 B2 | 8/2013 | Vignisson | |
| 8,510,253 B2 | 8/2013 | Anderson | |
| 8,564,621 B2 * | 10/2013 | Branson | ............... G06T 19/006 |
| | | | 345/631 |
| 8,781,515 B2 | 7/2014 | Agulnik | |
| 8,893,000 B2 | 11/2014 | Hamilton, II | |
| 8,893,049 B2 | 11/2014 | Dawson | |
| 9,310,955 B2 | 4/2016 | Haswell | |
| 9,692,721 B2 | 6/2017 | Yalcinalp | |
| 10,447,624 B2 | 10/2019 | Islam | |
| 10,659,288 B2 | 5/2020 | Takeuchi | |
| 10,671,742 B2 * | 6/2020 | Greatwood | ......... G06F 21/6263 |
| 10,817,066 B2 | 10/2020 | Ross | |
| 10,821,357 B1 | 11/2020 | Rotelli | |
| 10,902,437 B2 | 1/2021 | Bhogal | |
| 2001/0035976 A1 | 11/2001 | Poon | |
| 2002/0138624 A1 | 9/2002 | Esenther | |
| 2003/0097406 A1 | 5/2003 | Stafford | |

(Continued)

*Primary Examiner* — Linglan Edwards
*Assistant Examiner* — Phuc Pham
(74) *Attorney, Agent, or Firm* — Moore & Van Allen PLLC; Nicholas C. Russell

(57) ABSTRACT

Systems, computer program products, and methods are described herein for monitoring access to a virtual environment using device tagging. The present disclosure is configured to receive, from a user input device, a request from a user to establish a first virtual object to access a virtual environment; receive parameters associated with the first virtual object; determine device information associated with the user input device; generate a first unique key based on at least the parameters and the device information; link the user input device and the first virtual object with the first unique key; store the first unique key in a key repository; and establish the first virtual object for the user to access the virtual environment, wherein the first virtual object is established to access the virtual environment exclusively with the user input device.

14 Claims, 5 Drawing Sheets

(56)          References Cited

U.S. PATENT DOCUMENTS

| | | | |
|---|---|---|---|
| 2003/0225836 | A1 | 12/2003 | Lee |
| 2004/0001104 | A1 | 1/2004 | Sommerer |
| 2004/0225716 | A1 | 11/2004 | Shamir |
| 2020/0296128 | A1* | 9/2020 | Wentz ................. H04L 63/1433 |
| 2023/0092103 | A1* | 3/2023 | Puyol ..................... G06F 3/011 |
| | | | 715/205 |

* cited by examiner

100

130

140

140

110

NETWORK

140

140

140

140

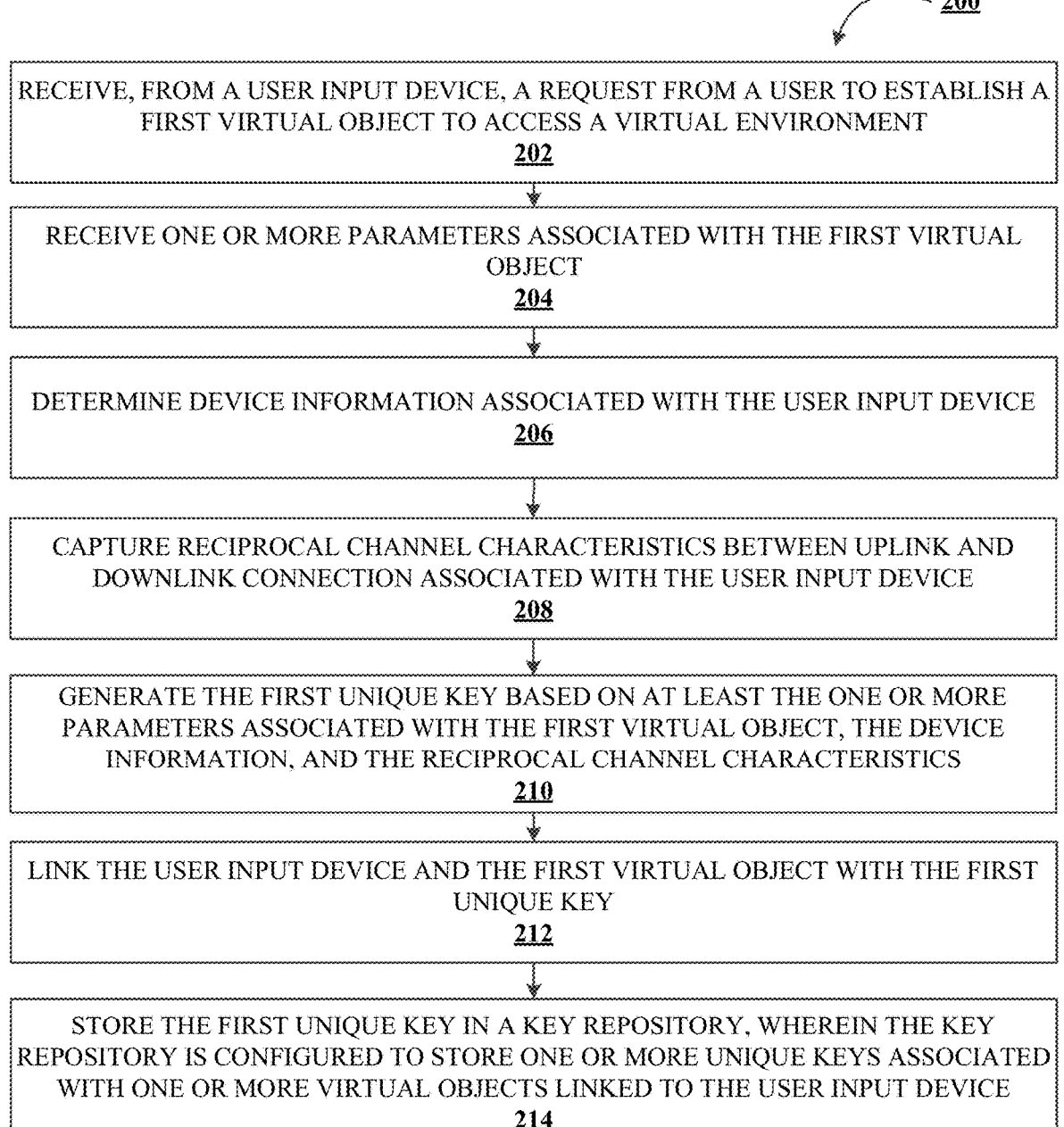

200

RECEIVE, FROM A USER INPUT DEVICE, A REQUEST FROM A USER TO ESTABLISH A FIRST VIRTUAL OBJECT TO ACCESS A VIRTUAL ENVIRONMENT
202

RECEIVE ONE OR MORE PARAMETERS ASSOCIATED WITH THE FIRST VIRTUAL OBJECT
204

DETERMINE DEVICE INFORMATION ASSOCIATED WITH THE USER INPUT DEVICE
206

CAPTURE RECIPROCAL CHANNEL CHARACTERISTICS BETWEEN UPLINK AND DOWNLINK CONNECTION ASSOCIATED WITH THE USER INPUT DEVICE
208

GENERATE THE FIRST UNIQUE KEY BASED ON AT LEAST THE ONE OR MORE PARAMETERS ASSOCIATED WITH THE FIRST VIRTUAL OBJECT, THE DEVICE INFORMATION, AND THE RECIPROCAL CHANNEL CHARACTERISTICS
210

LINK THE USER INPUT DEVICE AND THE FIRST VIRTUAL OBJECT WITH THE FIRST UNIQUE KEY
212

STORE THE FIRST UNIQUE KEY IN A KEY REPOSITORY, WHEREIN THE KEY REPOSITORY IS CONFIGURED TO STORE ONE OR MORE UNIQUE KEYS ASSOCIATED WITH ONE OR MORE VIRTUAL OBJECTS LINKED TO THE USER INPUT DEVICE
214

FIGURE 2

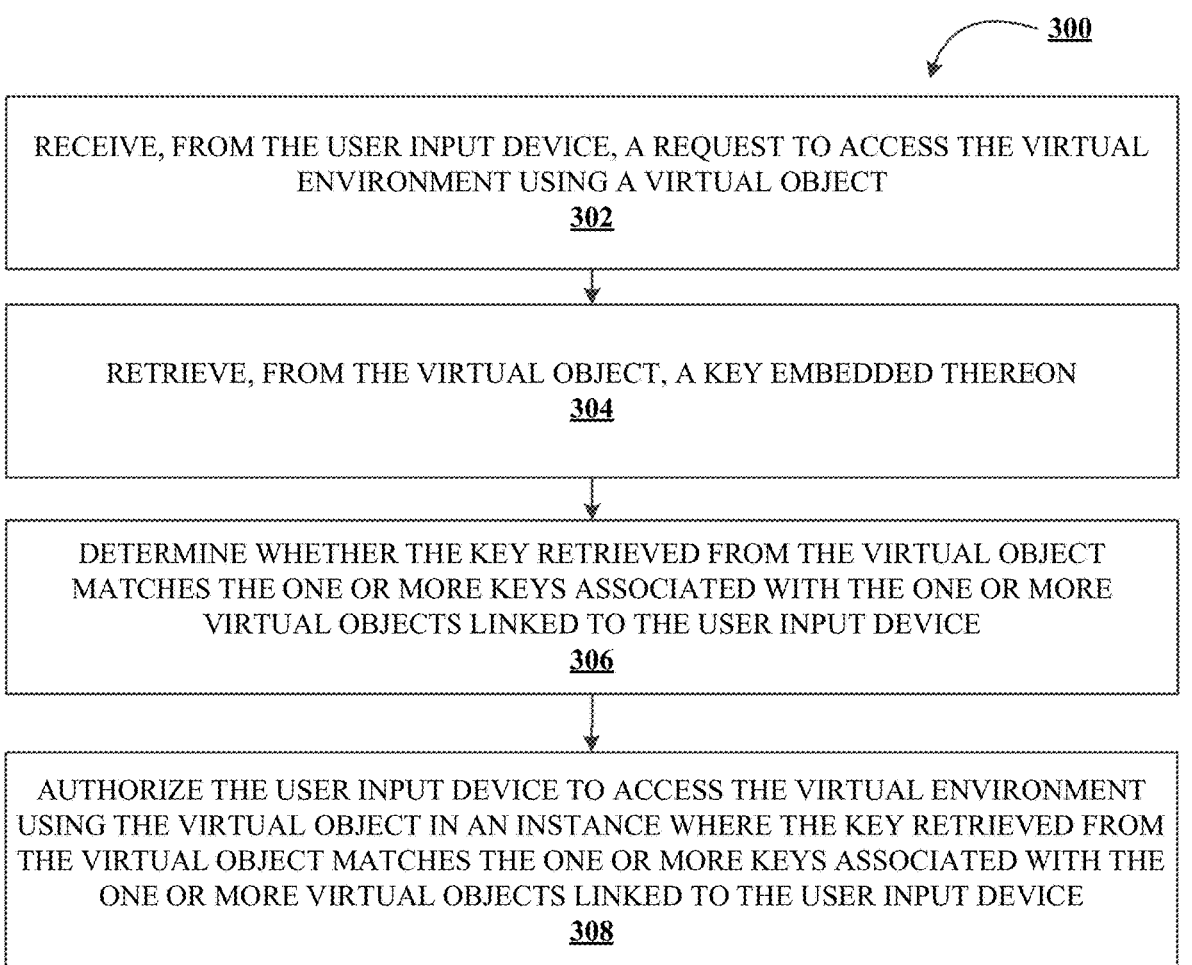

_300_

RECEIVE, FROM THE USER INPUT DEVICE, A REQUEST TO ACCESS THE VIRTUAL ENVIRONMENT USING A VIRTUAL OBJECT
_302_

RETRIEVE, FROM THE VIRTUAL OBJECT, A KEY EMBEDDED THEREON
_304_

DETERMINE WHETHER THE KEY RETRIEVED FROM THE VIRTUAL OBJECT MATCHES THE ONE OR MORE KEYS ASSOCIATED WITH THE ONE OR MORE VIRTUAL OBJECTS LINKED TO THE USER INPUT DEVICE
_306_

AUTHORIZE THE USER INPUT DEVICE TO ACCESS THE VIRTUAL ENVIRONMENT USING THE VIRTUAL OBJECT IN AN INSTANCE WHERE THE KEY RETRIEVED FROM THE VIRTUAL OBJECT MATCHES THE ONE OR MORE KEYS ASSOCIATED WITH THE ONE OR MORE VIRTUAL OBJECTS LINKED TO THE USER INPUT DEVICE
_308_

FIGURE 3

SYSTEM FOR MONITORING ACCESS TO A VIRTUAL ENVIRONMENT USING DEVICE TAGGING

TECHNOLOGICAL FIELD

Example embodiments of the present disclosure relate to monitoring access to a virtual environment.

BACKGROUND

The use of augmented and/or virtual reality computing environments (collectively referred to herein as "virtual environments") have become increasing more prevalent. By way of example, Metaverse is a hypothetical iteration of the Internet as a single, universal and immersive virtual environment that is facilitated by the use of virtual reality and augmented reality headsets.

Applicant has identified a number of deficiencies and problems associated with monitoring and authenticating access to a virtual environment. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for monitoring access to a virtual environment using device tagging.

In one aspect, a system for monitoring access to a virtual environment using device tagging is presented. The system comprising: a processing device; a non-transitory storage device containing instructions when executed by the processing device, causes the processing device to perform the steps of: receive, from a user input device, a request from a user to establish a first virtual object to access a virtual environment; receive one or more parameters associated with the first virtual object; determine device information associated with the user input device; generate a first unique key based on at least the one or more parameters associated with the first virtual object and the device information associated with the user input device; link the user input device and the first virtual object with the first unique key; store the first unique key in a key repository, wherein the key repository is configured to store one or more unique keys associated with one or more virtual objects linked to the user input device; and establish the first virtual object for the user to access the virtual environment, wherein the first virtual object is established to access the virtual environment exclusively with the user input device.

In some embodiments, executing the instructions further causes the processing device to: capture reciprocal channel characteristics between uplink and downlink connection associated with the user input device; and generate the first unique key based on at least the one or more parameters associated with the first virtual object, the device information, and the reciprocal channel characteristics.

In some embodiments, executing the instructions further causes the processing device to: discretely embed the first unique key on the first virtual object.

In some embodiments, executing the instructions further causes the processing device to: receive, from the user input device, a request to access the virtual environment using a virtual object; retrieve, from the virtual object, a key embedded thereon; determine whether the key retrieved from the virtual object matches the one or more keys associated with the one or more virtual objects linked to the user input device; and authorize the user input device to access the virtual environment using the virtual object in an instance where the key retrieved from the virtual object matches the one or more keys associated with the one or more virtual objects linked to the user input device.

In some embodiments, wherein executing the instructions further causes the processing device to: deny the user input device access to the virtual environment using the virtual object in an instance where the key retrieved from the virtual object does not match the one or more keys associated with the one or more virtual objects linked to the user input device.

In some embodiments, executing the instructions to generate the unique key further causes the processing device to: initiate a feed forward neural network (NN) on the one or more parameters associated with the first virtual object and the device information; and generate, using the feed forward NN, the first unique key based on at least the one or more parameters associated with the first virtual object and the device information.

In some embodiments, the first unique key is encrypted prior to being used to link the user input device and the first virtual object.

In another aspect, a computer program product for monitoring access to a virtual environment using device tagging is presented. The computer program product comprising a non-transitory computer-readable medium comprising code causing an apparatus to: receive, from a user input device, a request from a user to establish a first virtual object to access a virtual environment; receive one or more parameters associated with the first virtual object; determine device information associated with the user input device; generate a first unique key based on at least the one or more parameters associated with the first virtual object and the device information associated with the user input device; link the user input device and the first virtual object with the first unique key; store the first unique key in a key repository, wherein the key repository is configured to store one or more unique keys associated with one or more virtual objects linked to the user input device; and establish the first virtual object for the user to access the virtual environment, wherein the first virtual object is established to access the virtual environment exclusively with the user input device.

In yet another aspect, a method for monitoring access to a virtual environment using device tagging is presented. The method comprising: receiving, from a user input device, a request from a user to establish a first virtual object to access a virtual environment; receiving one or more parameters associated with the first virtual object; determining device information associated with the user input device; generating a first unique key based on at least the one or more parameters associated with the first virtual object and the device information associated with the user input device; linking the user input device and the first virtual object with the first unique key; storing the first unique key in a key repository, wherein the key repository is configured to store one or more unique keys associated with one or more virtual objects linked to the user input device; and establishing the first virtual object for the user to access the virtual environment, wherein the first virtual object is established to access the virtual environment exclusively with the user input device.

The above summary is provided merely for purposes of summarizing some example embodiments to provide a basic understanding of some aspects of the present disclosure.

Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
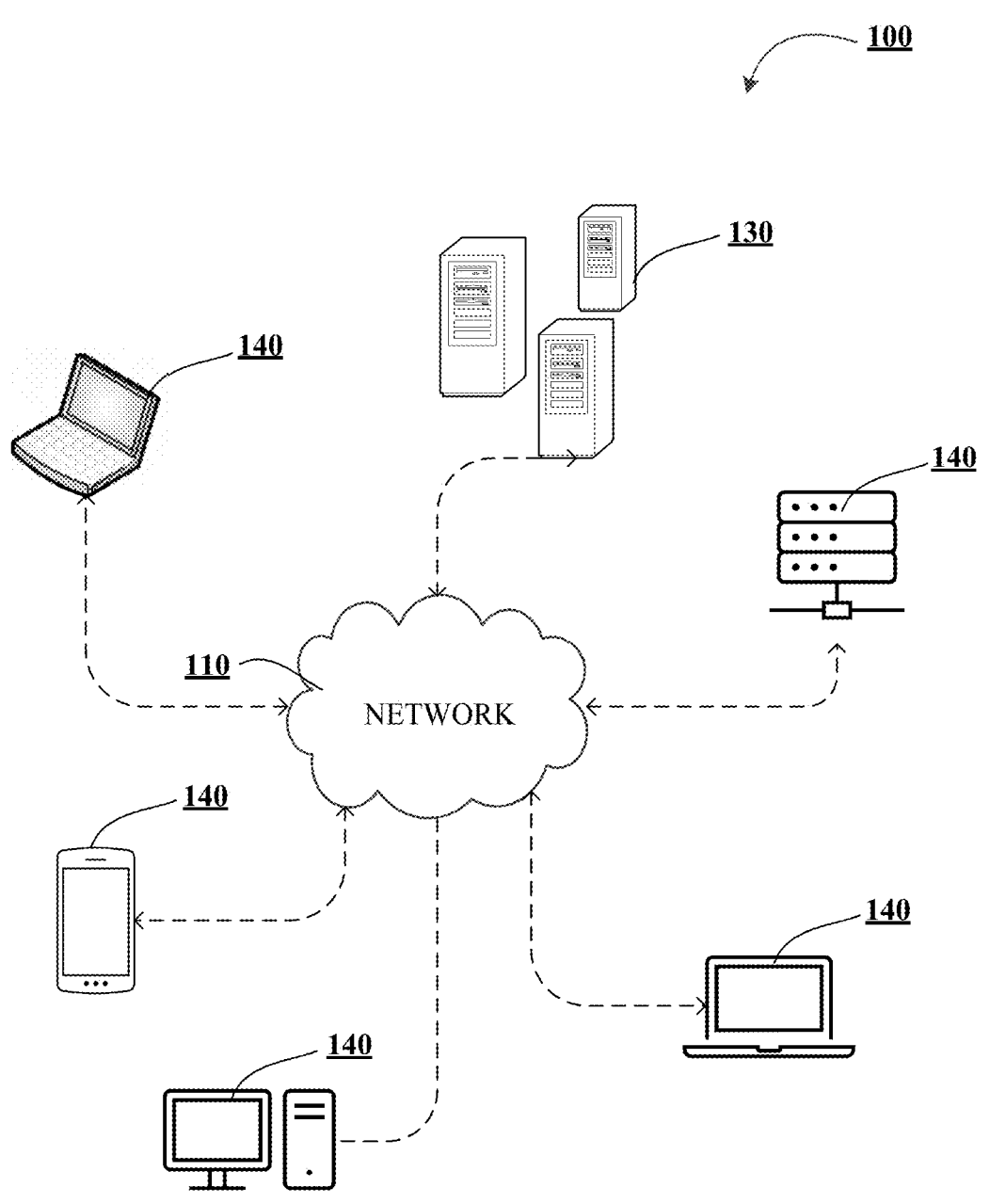
Figure 1B:
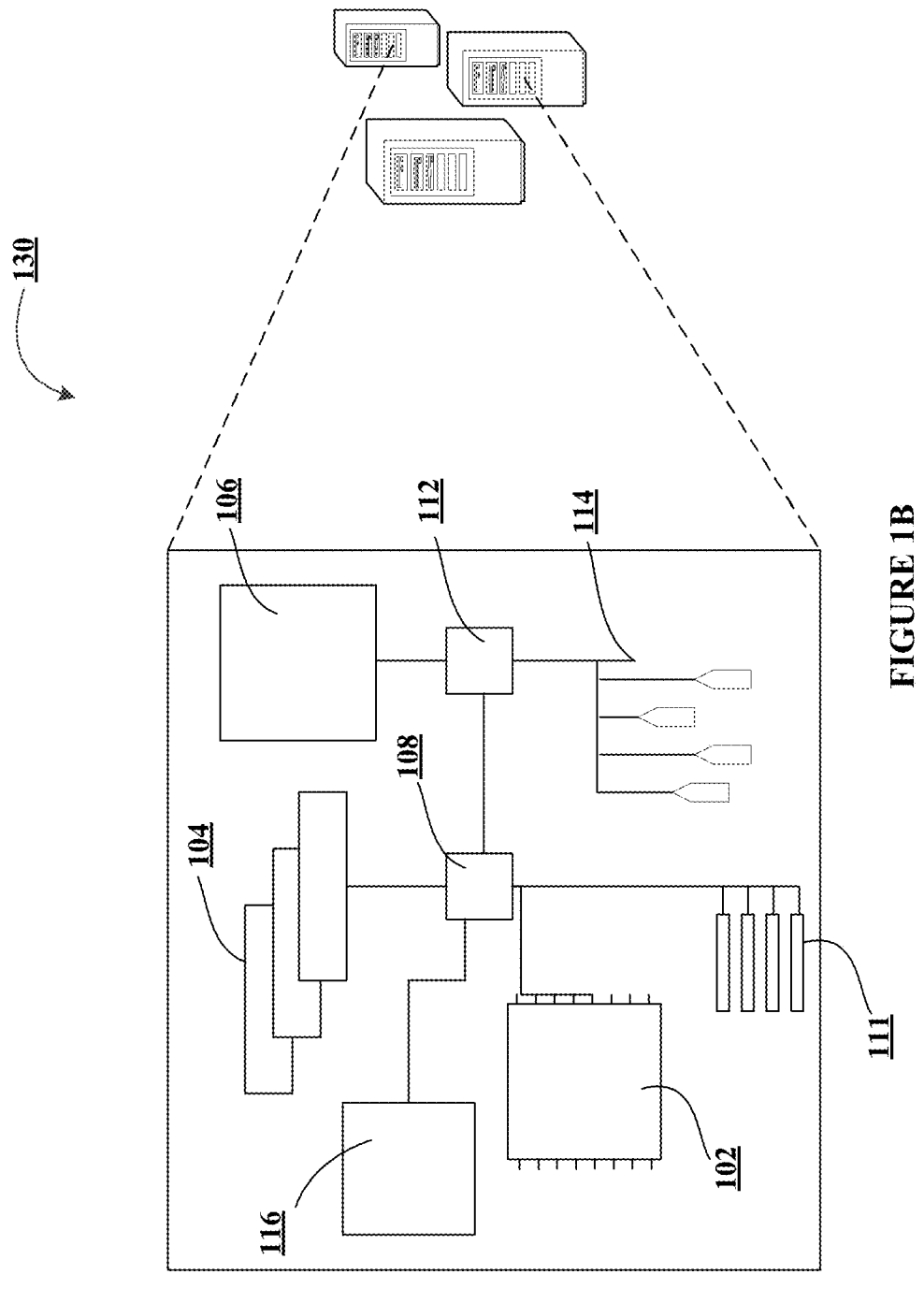
Figure 1C:
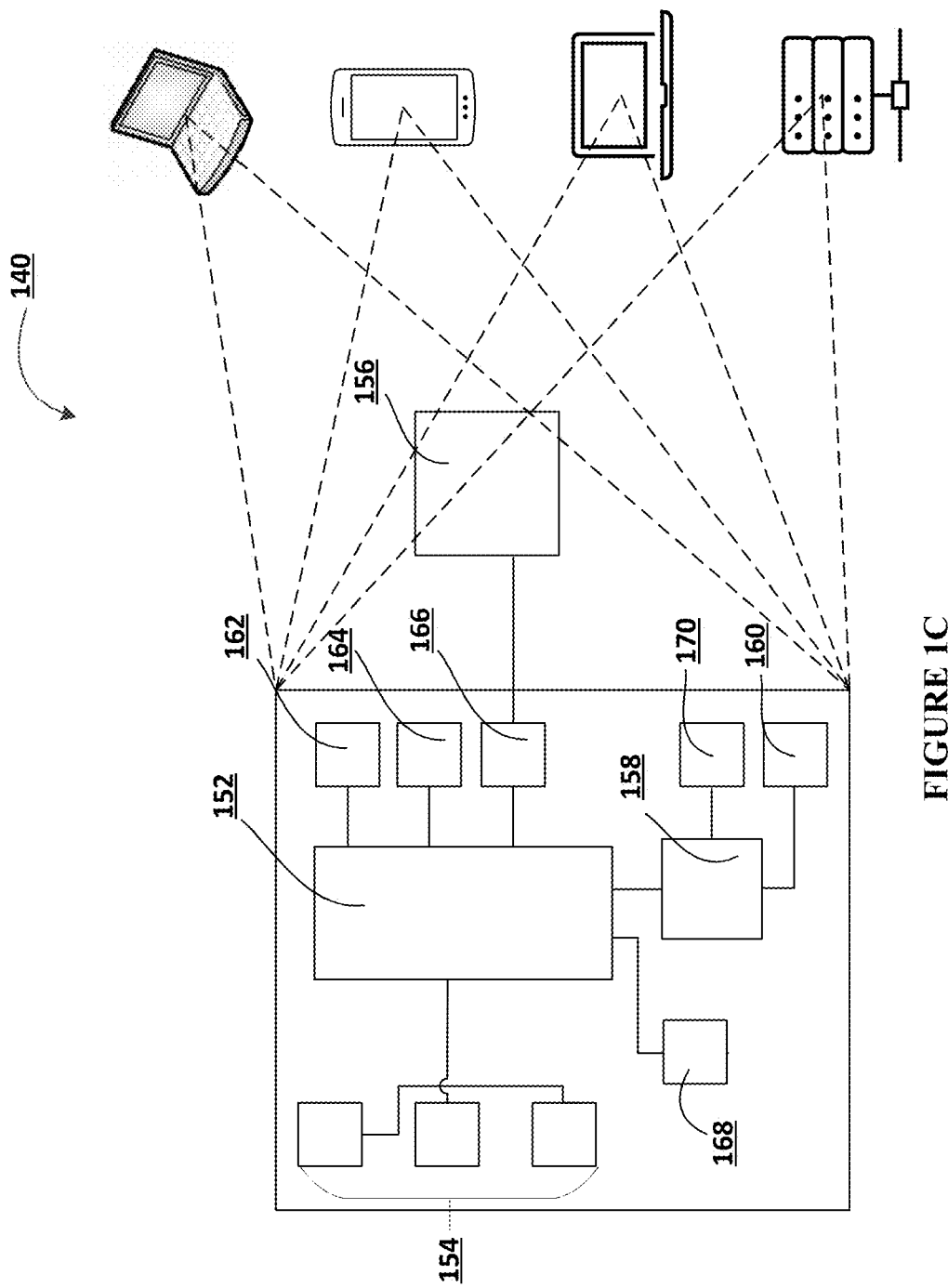

FIGS. 1A-1C illustrates technical components of an exemplary distributed computing environment for monitoring access to a virtual environment using device tagging, in accordance with an embodiment of the disclosure;

FIG. 2 illustrates a method for establishing access to a virtual environment using device tagging, in accordance with an embodiment of the disclosure; and FIG. 3 illustrates a method for authenticating a user in a virtual environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "virtual environment," which includes augmented reality computing environments, such as Metaverse or the like may refer to a collection of persistent, shared, three-dimensional virtual spaces linked into a perceived virtual universe. In some embodiments, a virtual environment may not only refer to virtual worlds, but the Internet as a whole, including the spectrum of augmented reality. A virtual environment may include a number of different elements such as video conferencing, digital currencies, virtual reality platforms, social media, live data streaming, digital representations of real-life objects and/or the like. In some embodiments, a virtual environment may include virtual properties, such as virtual land parcels and estates for users to create and build-on, or structures that reflect real-life properties and/or completely original creations. These spaces may be represented by coordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Metaverse, as an evolving paradigm of the next generation Internet, aims to build a fully immersive, and self-sustaining virtual shared space for humans to play, work, and socialize. The metaverse integrates a variety of emerging technologies. The Metaverse is the convergence of, (i) virtually enhanced physical reality, and (ii) physically persistent virtual space. It is a fusion of both, while allowing users to experience it as either. Driven by recent advances in emerging technologies such as extended reality, artificial intelligence, and distributed ledger technology, metaverse is stepping from science fiction to an upcoming reality. However, security and privacy concerns (often inherited from underlying technologies or emerged in the new digital ecology) of metaverse can impede its wide deployment. Therefore, there is a need for a system for monitoring access to a virtual environment using device tagging.

Accordingly, the present disclosure, (i) Receives, from a user input device, a request from a user to establish a first virtual object to access a virtual environment. The first virtual object may refer to a customizable graphical representation (e.g., avatar) of the user in the virtual environment, (ii) Receives one or more parameters associated with the first virtual object, (iii) Determines device information associated with the user input device, (iv) Captures reciprocal channel characteristics between uplink and downlink connection associated with the user input device. Reciprocal channel characteristics include a received signal strength (RSS), memory size and usage, response time, average latency, error rate, requests per second, throughput, and/or the like, (v) Generates the first unique key based on at least the one or more parameters associated with the first virtual object, the device information, and the reciprocal channel characteristics. The first unique key may be a string of alphanumeric characters with numbers, letters, and special characters (like an ampersand or hashtag) that is used to specifically link the user input device with the first virtual object. To generate the first unique key, the present disclosure: implements a cryptographic hash function to convert the random size input of the one or more parameters associated with the first virtual object, the device information, and the reciprocal channel characteristics into a fixed-size output. These fixed-size outputs are then used as inputs for a feed forward neural network (NN). Depending on the type of convergence algorithm used to synchronize the inputs and the outputs, once the convergence meets the mean squared error requirements of the feed forward NN, the corresponding weights are concatenated to form the first unique key, (vi) Links the user input device and the first virtual object with the first unique key, and (vii) Stores the first unique key in a key repository. The key repository is configured to store one or more unique keys associated with one or more virtual objects linked to the user input device. Each time a user attempts to access the virtual environment, the system may determine whether the user input device being used to access the virtual environment is linked to the virtual object selected by the user to represent themselves in the virtual environment. Once the system authorizes the user input device to access the virtual environment using the virtual object (e.g., first virtual object), the system may passively monitor the first virtual object during the course of its virtual session in the virtual environment.

What is more, the present disclosure provides a technical solution to a technical problem. As described herein, the technical problem includes authenticating a request to access a virtual environment using cryptographic techniques. The technical solution presented herein allows for fewer steps to achieve the solution, thus reducing the amount of computing resources, such as processing resources, storage resources, network resources, and/or the like, that are being used. In addition, the technical solution provides a more accurate solution to problem, thus reducing the number of resources required to remedy any errors made due to a less accurate solution. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for monitoring access to a virtual environment using device tagging 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as augmented/virtual reality headset, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application (e.g., virtual reality application) that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications (e.g., virtual reality application) or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a method for establishing access to a virtual environment using device tagging 200, in accordance with an embodiment of the disclosure. As shown in block 202, the method includes receiving, from a user input device, a request from a user to establish a first virtual object to access a virtual environment. As described herein, the first virtual object may refer to a customizable graphical representation (e.g., avatar) of the user in the virtual environment. To access a virtual environment, each user is required to establish a virtual object.

Next, as shown in block 204, the method includes receiving one or more parameters associated with the first virtual object. Due to the customizable nature of virtual objects, in some embodiments, the user may provide specific parameters to establish the first virtual object. Examples of these parameters may include static parameters, such as color, shape, size, and/or the like, dynamic parameters such as voice type, movement mechanics, and/or the like, perspective parameters such as first person virtual objects, third person virtual objects, and/or the like, dimensional parameters such as 2-dimensional or 3-dimensional representation, feedback parameters based on interactions with various resources in the virtual environment, such as haptic response, audio response, video response, and/or the like, and access parameters indicating permission level, authorization level, access to specific resources and/or the like.

Next, as shown in block 206, the method includes determining device information associated with the user input device. In some embodiments, the device information may be a unique device identifier such as International Mobile Equipment Identity (IMEI) number, contact lists (in some cases), technical data associated with the device including details regarding applications and usage.

Next, as shown in block 208, the method includes capturing reciprocal channel characteristics between uplink and downlink connection associated with the user input device. In some embodiments, the reciprocal channel characteristics may include a received signal strength (RSS), memory size and usage, response time, average latency, error rate, requests per second, throughput, and/or the like.

Next, as shown in block 210, the method includes generating the first unique key based on at least the one or more parameters associated with the first virtual object, the device information, and the reciprocal channel characteristics. In some embodiments, the first unique key may be a string of alphanumeric characters with numbers, letters, and special characters (like an ampersand or hashtag) that is used to specifically link the user input device with the first virtual object. To generate the first unique key, the method may include implementing a cryptographic hash function to convert the random size input of the one or more parameters associated with the first virtual object, the device information, and the reciprocal channel characteristics into a fixed-size output. These fixed-size outputs are then used as inputs for a feed forward neural network (NN). Feed forward NNs are artificial neural networks in which nodes do not form loops. The feed forward NN is also known as a multi-layer neural network as all information is only passed forward. Depending on the level of complexity required, the feed forward NNs may have as little or as many hidden layers to process the inputs when generating the first unique key. Depending on the type of convergence algorithm used to synchronize the inputs and the outputs, once the convergence meets the mean squared error requirements of the feed forward NN, the corresponding weights are concatenated to form the first unique key.

Next, as shown in block 212, the method includes linking the user input device and the first virtual object with the first unique key. By creating a virtual object that is linked to a particular user input device, the system may establish an additional layer of security for access to the virtual environment. Each time a user attempts to access the virtual environment, the system may determine whether the user input device being used to access the virtual environment is linked to the virtual object selected by the user to represent themselves in the virtual environment. As such, in some example embodiments, while a user input device may be associated with multiple virtual objects, each virtual object may only be linked to a single user input device. In some embodiments, the first unique key may undergo an additional layer of encryption prior to being used to link the user input device and the first virtual object.

Next, as shown in block 214, the method includes storing the first unique key in a key repository, wherein the key repository is configured to store one or more unique keys associated with one or more virtual objects linked to the user input device. In some embodiments, in addition to storing the first unique key in the key repository, the method may include discretely embedding the first unique key on the first virtual object.

FIG. 3 illustrates a method for authenticating a user in a virtual environment 300, in accordance with an embodiment of the disclosure. As shown in block 302, the method includes receiving, from the user input device, a request to access the virtual environment using a virtual object. As described herein, the first virtual object may be established for the user to access the virtual environment in such a way that the user may access the virtual environment only when the user is using the user input device and has selected the first virtual object that has been established to access the virtual environment exclusively with the user input device.

Next, as shown in block 304, the method includes retrieving, from the virtual object, a key embedded thereon. In some embodiments, if the virtual object does not have a key embedded thereon, the method may include denying the user access to the virtual environment as the virtual object selected by the user was not established to access the virtual environment. However, if the virtual object has a key embedded thereon, the method may include retrieving the key to, (i) determine whether the virtual object was established to access the virtual environment, and/or (ii) determine whether the virtual object is linked to the user input device.

Next, as shown in block 306, the method includes determining whether the key retrieved from the virtual object matches the one or more keys associated with the one or more virtual objects linked to the user input device. In embodiments where the key is encrypted, the method may include decrypt (decoding) the key prior to determining whether the key matches the one or more keys associated with the virtual objects linked to the user input device. If the key matches the one or more keys, then the method may include determining that the virtual object was not only established to access the virtual environment, but was established to access the virtual environment exclusively with the user input device.

Next, as shown in block 308, the method includes authorizing the user input device to access the virtual environment using the virtual object in an instance where the key retrieved from the virtual object matches the one or more keys associated with the one or more virtual objects linked to the user input device. On the other hand, if the key retrieved from the virtual object does not match the one or more keys associated with the one or more virtual objects linked to the user input device, the system may deny the user input device access to the virtual environment using the virtual object.

In embodiments where the first virtual object is active, i.e., being used to access various resources in the virtual environment, the first virtual object may be configured to continuously (or periodically) broadcast the first unique key. In this way, once the system authorizes the user input device to access the virtual environment using the virtual object (e.g., first virtual object), the system may passively monitor the first virtual object during the course of its virtual session in the virtual environment. To this end, at each period, the system may receive the first unique key broadcast by the first virtual object and ensure that the first unique key matches the one or more keys associated with the one or more virtual objects linked to the user input device. In some embodiments, the system may make this determination passively, i.e., in the background, so as to not intervene with the virtual session. However, at any period, if the first unique key no longer matches the one or more keys associated with the one or more virtual objects linked to the user input device, the system may temporarily pause the virtual session and allow the user an opportunity to rectify the issue. If the user does not rectify the issue within a specified amount of time, the system may terminate the virtual session.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring access to a virtual environment using device tagging, the system comprising:
a processing device;
a non-transitory storage device containing instructions when executed by the processing device, causes the processing device to perform the steps of:
receive, from a user input device, a request from a user to establish a first virtual object to access a virtual environment;
receive one or more parameters associated with the first virtual object;
determine device information associated with the user input device;
generate a first unique key based on at least the one or more parameters associated with the first virtual object and the device information associated with the user input device, wherein generating the first unique key further comprises:
initiating a feed forward neural network (NN) on the one or more parameters associated with the first virtual object, the device information, and reciprocal channel characteristics between uplink and downlink connection associated with the user input device, wherein the reciprocal channel characteristics comprise at least received signal strength (RSS), memory size and usage, response time, average latency, error rate, requests per second, and throughput; and
generating, using the feed forward NN, the first unique key based on at least the one or more parameters associated with the first virtual object and the device information;
link the user input device and the first virtual object with the first unique key;
store the first unique key in a key repository, wherein the key repository is configured to store one or more unique keys associated with one or more virtual objects linked to the user input device; and
establish the first virtual object for the user to access the virtual environment, wherein the first virtual object is established to access the virtual environment exclusively with the user input device.

2. The system of claim 1, wherein executing the instructions further causes the processing device to:
discretely embed the first unique key on the first virtual object.

3. The system of claim 1, wherein executing the instructions further causes the processing device to:
receive, from the user input device, a request to access the virtual environment using a virtual object;
retrieve, from the virtual object, a key embedded thereon;
determine whether the key retrieved from the virtual object matches the one or more keys associated with the one or more virtual objects linked to the user input device; and
authorize the user input device to access the virtual environment using the virtual object in an instance where the key retrieved from the virtual object matches the one or more keys associated with the one or more virtual objects linked to the user input device.

4. The system of claim 3, wherein executing the instructions further causes the processing device to:

deny the user input device access to the virtual environment using the virtual object in an instance where the key retrieved from the virtual object does not match the one or more keys associated with the one or more virtual objects linked to the user input device.

5. The system of claim 1, wherein the first unique key is encrypted prior to being used to link the user input device and the first virtual object.

6. A computer program product for monitoring access to a virtual environment using device tagging, the computer program product comprising a non-transitory computer-readable medium comprising code causing an apparatus to:

receive, from a user input device, a request from a user to establish a first virtual object to access a virtual environment;

receive one or more parameters associated with the first virtual object;

determine device information associated with the user input device;

generate a first unique key based on at least the one or more parameters associated with the first virtual object and the device information associated with the user input device, wherein generating the first unique key further comprises:

initiating a feed forward neural network (NN) on the one or more parameters associated with the first virtual object, the device information, and reciprocal channel characteristics between uplink and downlink connection associated with the user input device, wherein the reciprocal channel characteristics comprise at least received signal strength (RSS), memory size and usage, response time, average latency, error rate, requests per second, and throughput; and generating, using the feed forward NN, the first unique key based on at least the one or more parameters associated with the first virtual object, the device information, and the reciprocal channel characteristics;

link the user input device and the first virtual object with the first unique key;

store the first unique key in a key repository, wherein the key repository is configured to store one or more unique keys associated with one or more virtual objects linked to the user input device; and establish the first virtual object for the user to access the virtual environment, wherein the first virtual object is established to access the virtual environment exclusively with the user input device.

7. The computer program product of claim 6, wherein the code further causes the apparatus to: discretely embed the first unique key on the first virtual object.

8. The computer program product of claim 6, wherein the code further causes the apparatus to: receive, from the user input device, a request to access the virtual environment using a virtual object; retrieve, from the virtual object, a key embedded thereon; determine whether the key retrieved from the virtual object matches the one or more keys associated with the one or more virtual objects linked to the user input device; and authorize the user input device to access the virtual environment using the virtual object in an instance where the key retrieved from the virtual object matches the one or more keys associated with the one or more virtual objects linked to the user input device.

9. The computer program product of claim 8, wherein the code further causes the apparatus to:

deny the user input device access to the virtual environment using the virtual object in an instance where the key retrieved from the virtual object does not match the one or more keys associated with the one or more virtual objects linked to the user input device.

10. The computer program product of claim 6, wherein the first unique key is encrypted prior to being used to link the user input device and the first virtual object.

11. A method for monitoring access to a virtual environment using device tagging, the method comprising:

receiving, from a user input device, a request from a user to establish a first virtual object to access a virtual environment;

receiving one or more parameters associated with the first virtual object;

determining device information associated with the user input device;

generating a first unique key based on at least the one or more parameters associated with the first virtual object and the device information associated with the user input device, wherein generating the first unique key further comprises:

initiating a feed forward neural network (NN) on the one or more parameters associated with the first virtual object, the device information, and reciprocal channel characteristics between uplink and downlink connection associated with the user input device, wherein the reciprocal channel characteristics comprise at least received signal strength (RSS), memory size and usage, response time, average latency, error rate, requests per second, and throughput; and generating, using the feed forward NN, the first unique key based on at least the one or more parameters associated with the first virtual object, the device information, and the reciprocal channel characteristics;

linking the user input device and the first virtual object with the first unique key;

storing the first unique key in a key repository, wherein the key repository is configured to store one or more unique keys associated with one or more virtual objects linked to the user input device; and establishing the first virtual object for the user to access the virtual environment, wherein the first virtual object is established to access the virtual environment exclusively with the user input device.

12. The method of claim 11, wherein the method further comprises:

discretely embedding the first unique key on the first virtual object.

13. The method of claim 11, wherein the method further comprises:

receiving, from the user input device, a request to access the virtual environment using a virtual object;

retrieving, from the virtual object, a key embedded thereon;

determining whether the key retrieved from the virtual object matches the one or more keys associated with the one or more virtual objects linked to the user input device; and authorizing the user input device to access the virtual environment using the virtual object in an instance where the key retrieved from the virtual object matches the one or more keys associated with the one or more virtual objects linked to the user input device.

14. The method of claim 13, wherein the method further comprises:

denying the user input device access to the virtual environment using the virtual object in an instance where the key retrieved from the virtual object does not match the one or more keys associated with the one or more virtual objects linked to the user input device.

\* \* \* \* \*